United States Patent [19]

Matsuzaki et al.

[11] Patent Number: 5,319,002
[45] Date of Patent: Jun. 7, 1994

[54] EPOXY POWDER COATING COMPOSITION FOR USE IN ELECTROSTATIC COATING

[75] Inventors: Kunimitsu Matsuzaki, Yono; Seitaro Iwamoto; Takeshi Watanabe, both of Soka; Kazuya Ono, Tokyo; Katsuji Kitagawa, Kasukabe, all of Japan

[73] Assignee: Somar Corporation, Japan

[21] Appl. No.: 960,815

[22] Filed: Oct. 14, 1992

Related U.S. Application Data

[62] Division of Ser. No. 811,137, Dec. 20, 1991, Pat. No. 5,204,387.

[30] Foreign Application Priority Data

Dec. 28, 1990 [JP] Japan ................................. 2-416980
Jan. 30, 1991 [JP] Japan ................................. 3-32072
Mar. 29, 1991 [JP] Japan ................................. 3-93447

[51] Int. Cl.$^5$ ............................ C09D 5/46; C09D 7/12; C09D 133/12; C09D 163/00
[52] U.S. Cl. .................................... 523/221; 525/115; 525/119; 525/934
[58] Field of Search ................. 523/221; 525/115, 119, 525/934

[56] References Cited

U.S. PATENT DOCUMENTS

| | | | |
|---|---|---|---|
| 3,860,557 | 1/1975 | Millar et al. | 523/221 |
| 5,025,067 | 6/1991 | Yamamoto | 525/119 |
| 5,034,432 | 7/1991 | Ueno | 523/221 |
| 5,114,823 | 5/1992 | Tomura | 430/120 |

FOREIGN PATENT DOCUMENTS 389080 9/1990 European Pat. Off. ............ 523/221
61-252276 11/1986 Japan .

OTHER PUBLICATIONS

Patent Abstracts of Japan, vol. 13, No. 442, Oct. 3, 1989.

*Primary Examiner*—John G. Bleutge
*Assistant Examiner*—D. R. Wilson
*Attorney, Agent, or Firm*—Lorusso & Loud

[57] ABSTRACT

A powder coating composition is disclosed which includes a particulate material containing an epoxy resin and a curing agent, and fine powder of a charge controlling agent such as an acrylic resin, silica or a mixture thereof. The charge controlling agent is deposited on surfaces of the particles of the particulate material.

3 Claims, No Drawings

EPOXY POWDER COATING COMPOSITION FOR USE IN ELECTROSTATIC COATING

This is a division of application Ser. No. 07/811,137, filed Dec. 20, 1991, now U.S. Pat. No. 5,204,387.

This invention relates to a powder coating composition suitable for use in electrostatic coating.

Electrostatic coating is now used in various fields because of a lot of advantages thereof such as easiness in controlling the thickness of coatings and absence of a step of preheating articles to be coated. Thus, a number of powder coating compositions are commercially available for use in electrostatic coating processes. Known powder coating compositions, however, has a problem because it is difficult to obtain thick coatings having a smooth surface. Namely, when a coating having a thickness of 250 μm or more is to be formed, particles of the coating composition cause electrostatic repelling so that the surface of the resulting coating becomes non-uniform.

The present invention has been made with the foregoing problem in conventional powder coating composition in view. In accordance with one aspect of the present invention there is provided a powder coating composition comprising a particulate material consisting of particles having a particle size in the range of 3-180 μm and a volume resistivity of at least $10^7$ ohm.cm and each containing an epoxy resin and a curing agent for the epoxy resin, and a charge controlling agent selected from the group consisting of an acrylic resin having an average particle size in the range of 0.05-1 μm and silica whose primary particles having an average particle size in the range of 2-500 nm, the amount of said charge controlling agent being 0.01-5% based on the total weight of said particulate material and said charge controlling agent, and said charge controlling agent being present on surfaces of said particles of said particulate material.

In another aspect, the present invention provides a powder coating composition comprising:

a first particulate material consisting of first particles having a particle size in the range of 3-180 μm and a volume resistivity of at least $10^7$ ohm.cm and each containing a first epoxy resin and a first curing agent for the first epoxy resin;

a second particulate material consisting of second particles having a particle size in the range of 3-180 μm and a volume resistivity of at least $10^7$ ohm.cm and each containing a second epoxy resin and a second curing agent for the second epoxy resin;

a first, particulate, charge controlling agent depositing on surfaces of said first particulate material; and a second, particulate, charge controlling agent depositing on surfaces of said second particulate material, said first and second charge controlling agent differing in static characteristics.

The present invention will now be described in detail below.

First Embodiment

The powder coating composition of tho first embodiment according to the present invention is composed of a particulate material consisting of particles having a particle size in the range of 3-180 μm and a volume resistivity of at least $10^7$ ohm.cm. Each of the particles contains an epoxy resin and a curing agent for the epoxy resin.

Any conventionally used epoxy resin may be used in the present invention. Examples of suitable epoxy resins include glycidyl ethers of bisphenol A, bisphenol S, bisphenol F, phenol novolak resins and cresol novolak resins; glycidyl ester epoxy resins; glycidyl amino epoxy resins; cycloaliphatic epoxy resins; linear aliphatic epoxy resins; heterocyclic epoxy resins; and halogenated epoxy resins. These epoxy resins may be used singly or as a mixture of two or more. Epoxy resins which are solid at 20° C. are generally used. But, it is possible to use the solid epoxy resins in conjunction with liquid epoxy resins as long as the mixed epoxy resins are solid at 20° C.

Conventional curing agents may be used for the above epoxy resins. Illustrative of suitable curing agents are aromatic amines, acid anhydrides, guanidine compounds such as dicyandiamide, and imidazole compounds.

In addition to the epoxy resin and the curing agent, the particulate material may further contain a filler, a pigment or the like conventional additive.

The particulate material is blended, in a dry state using, for example, a Henschel mixer or a Nauta mixer, with a charge controlling agent selected from an acrylic resin having an average particle size in the range of 0.05-1 μm, preferably 0.15-0.6 μm and silica whose primary particles having an average particle size in the range of 2-500 nm, preferably 5-100 nm so that the charge control agent deposits on the surface of the particles of the particulate material. The amount of the charge controlling agent is 0.01-5% based on the total weight of the particulate material and the charge controlling agent.

The acrylic resin to be used as the charge controlling agent is a homopolymer or a copolymer of an alkyl ester of acrylic or methacrylic acid. Polymethyl methacrylates and polymethyl acrylates are examples of suitable acrylic resins.

When frictionallly contacted with iron powder, acrylic resins are either positively or negatively charged. Both of the positively and negatively chargeable acrylic resins may be used for the purpose of the present invention. In this case, it is preferred that the negatively chargeable acrylic resins or a mixture of the negatively chargeable and positively chargeable acrylic resins be used in combination with the particulate material which is good in chargeability. In the case of the particulate material which is relatively poor in chargeability, then it is preferred that the particulate material be used in combination with the positively chargeable acrylic resins or a mixture of the positively chargeable and negatively chargeable acrylic resins. The mixing ratio of the positively chargeable acrylic resin to the negatively chargeable acrylic resin is selected so as to obtain optimum results according to the chargeability of the particulate material.

The ratings of "good" and "poor" in the chargeability of the particulate material are determined by as follows: Sample particulate material is discharged through a nozzle of an electrostatic coating gun (Model AH-1 manufactured by Nordson Inc.) with an air pressure for discharging the particulate material of 1.5 kg/cm² and an air pressure for accelerating the particulate material of 3.5 kg/cm² while measuring the charge by means of a charge meter equipped in the coating gun. When the measured charge is 0.6 mA or more, the particulate material is rated as being good in chargeability. When the measured charge is less than 0.6 mA, then the particulate material is rated as being poor in chargeability.

The amount of the acrylic resin to be blended with the particulate material is preferably 0.1–1% by weight based on the total weight of the acrylic resin and the particulate material.

Silica to be used as the charge controlling agent may be surface-treated or non-treated silica. Surface treatment of silica is performed so as to modify the silanol groups thereof with a trimethylsilyl group, aminosilyl group or the like group.

When silica is dispersed in water to form a slurry containing 5% by weight of the silica, the slurry shows various pH values according to the type thereof. The silica whose such slurry shows a pH of less than 7 is referred to as being "acidic" while the silica providing a pH of 7 or more is referred to as being "alkaline" in the present specification. Generally, non-treated silica is acidic because of the presence of silanol groups, while surface-treated silica is alkaline because the silanol groups have been modified.

It is preferred that alkaline silica or a mixture of alkaline silica and acidic silica be used in combination with the particulate material which is good in chargeability. In the case of the particulate material which is relatively poor in chargeability, then it is preferred that the particulate material be used in combination with acidic silica or a mixture of alkaline and acidic silica. The mixing ratio of the alkaline silica to the acidic silica is selected so as to obtain optimum results according to the chargeability of the particulate material.

The amount of the silica to be blended with the particulate material is preferably 0.01–1% by weight, more preferably 0.05–0.1% by weight based on the total weight of the silica and the particulate material.

Second Embodiment

In the second embodiment according to the present invention, two, different, first and second charge controlling agents are used and are separately deposited on different particles of particulate material.

The particulate material described with reference to the above first embodiment may be used in the second embodiment. The particulate material on which the first charge controlling agent is to be deposited may be the same as or different from that on which the second charge controlling agent is to be deposited.

The charge controlling agent is fine powder (with a particle size of 1 μm or less) of an organic or inorganic substance which is inert to the curing reaction of the epoxy resin and which has a polar group so that it can change the static characteristics of the particulate material when deposited on the particulate material. Illustrative of charge controlling agents are organic polymers containing oxygen, nitrogen, sulfur or the like polar elements, inorganic oxides and metal salts. Especially suitable is the use of the acrylic resin or silica described with reference to the first embodiment.

The two, first and second charge controlling agents to be used in the present invention should differ in static characteristics from each other. The difference in chargeability results from various surface properties of the particles of the charge controlling agents, such as surface acidity and polarity. Such a difference in static characteristics may be created by, for example, surface treating suitable organic or inorganic powder in two different manners. The surface treatment may be, for example, a heat treatment, a radiation treatment, a treatment with an acid or an alkali, a chemical modification treatment and an adsorption treatment. More specifically, by treating a powder with an organic acid and by separately treating similar powder with an organic base, there are obtained two charge controlling agents with different static characteristics (surface acidity). In this case, nontreated powder may be substituted for one of the acidic and alkaline charge controlling agents.

It is preferable to use a combination of first and second charge controlling agents showing pH of 7 or more and less than 7, respectively, when dispersed in water in an amount of 5% by weight. Such first and second charge controlling agents are suitably formed of silica having unmodified silanol groups and treated silica having modified silanol groups, respectively. It is also preferable to use a combination of first and second charge controlling agents which are positively and negatively charged, respectively, upon contact with iron powder. Such first and second charge controlling agents are formed of acrylic resins. Thus, those charge controlling agents described above with reference to the first embodiment are suitably used in the second embodiment.

The coating composition according to the second embodiment may be obtained as follows. First, two particulate materials $A_1$ and $B_1$, which may be the same or different and each of which contains an epoxy resin and a curing agent are provided. Two particulate, charge controlling agents $A_2$ and $B_2$ are then dry mixed with the particulate materials $A_1$ and $B_1$, respectively, to deposit the charge controlling agents $A_2$ and $B_2$ on the particulate materials $A_1$ and $B_1$, respectively, thereby to obtain two kinds of mixtures $A_3$ and $B_3$. The two mixtures $A_3$ and $B_3$ are blended with each other to obtain the powder coating composition of the present invention. The blending ratio $A_3:B_3$ is suitably 1:9 to 9:1, more preferably 3:7 to 7:3. The total amount of $A_2$ and $B_2$ is generally in the range of 0.01–10%, preferably 0.1–5% based on the total weight of $A_1$, $B_1$, $A_2$ and $B_2$.

The following examples will further illustrate the present invention.

EXAMPLE 1

Powder coating compositions were prepared by dry blending the ingredients shown in Table 1 in proportions (% by weight) shown in Table 1. The ingredients used are as follows:

Particulate material
    EPIFOAM F-221 (manufactured by Somar Corporation)
        Epoxy resin: diglycidyl ether of bisphenol A
        Curing agent: dicyandiamide
        Particle size: 80 mesh or finer
        Volume resistivity: $5 \times 10^{16}$ ohm.cm
        Charge: 0.7 mA (good chargeability)
    EPIFOAM F-220 (manufactured by Somar Corporation)
        Epoxy resin: diglycidyl ether of bisphenol A
        Curing agent: imidazole
        Particle size: 80 mesh or finer
        Volume resistivity: $3 \times 10^{16}$ ohm.cm
        Charge: 0.4 mA (poor chargeability)
Charge controlling agent:
    Silica, CARPLEX FPS-3 (manufactured by Shionogi Inc.)
        pH of 5% Slurry: 7.5
        Average particle size: about 15 nm (primary particles)

Silica, CARPLEX #1120 (manufactured by Shionogi Inc.)
pH of 5% Slurry: 10.7
Average particle size: about 15 nm (primary particles)
Silica, AEROSIL #300 (manufactured by Nihon Aerosil Inc.)
pH of 5% Slurry: 4
Average particle size: about 7 nm (primary particles)
Non-treated
Polymethyl methacrylate, MP-2701 (manufactured by Soken Kagaku K. K.)
Chargeability: positively charged upon contact with iron
Particle size: 0.35–0.5 μm
Mw: $4 \times 10^4$–$10 \times 10^4$
Polymethyl methacrylate, MP-1000 (manufactured by Soken Kagaku K. K.)
Chargeability: negatively charged upon contact with iron
Particle size: 0.35–0.5 μm
Mw: $25 \times 10^4$–$50 \times^4$ The thus prepared coating compositions were tested for their performance in electrostatic coating. The tests are performed as follows:

A motor armature having 10 slots each having a length of 40 mm, a diameter of 29 mm and a width of 2 mm is coated with a test sample coating composition using an electrostatic fluidized bed coating apparatus for 30 seconds at a voltage of 50 KV with a fluidizing air atmosphere of 0.2 kg/cm². The amount of the coating composition applied is measured. The condition of the slots is observed to determine whether or not the coating composition is got sufficiently into the the slots to the depth thereof.

The results are summarized in Table 1.

TABLE 1

| Experiment No. | 1 | 2 | 3 | 4 | 5 | 6 | 7 | 8 | 9 | 10 | 11* | 12* |
|---|---|---|---|---|---|---|---|---|---|---|---|---|
| Particulate Material | | | | | | | | | | | | |
| EPIFOAM F-221 | 99.9 | 99.9 | 99.9 | | | 99.8 | 99.7 | 99.7 | | | 100 | |
| EPIFOAM F-220 | | | | 99.9 | 99.9 | | | | 99.7 | 99.7 | | 100 |
| Silica | | | | | | | | | | | | |
| CARPLEX FPS-3 | 0.1 | | | | | | | | | | | |
| CARPLEX #1120 | | 0.1 | 0.05 | | 0.05 | | | | | | | |
| AEROSIL #300 | | | 0.05 | 0.1 | 0.05 | | | | | | | |
| Acrylic Resin | | | | | | | | | | | | |
| MP-2701 | | | | | | | 0.3 | 0.2 | 0.3 | 0.1 | | |
| MP-1000 | | | | | | 0.2 | | 0.1 | | 0.2 | | |
| Amount of Coating (g) | 3.3 | 4.0 | 3.2 | 3.1 | 3.1 | 3.3 | 3.0 | 3.2 | 4.3 | 3.9 | 2.5 | 2.5 |
| Condition Coating in Slots | good | good | good | good | good | good | good | good | good | good | poor | poor |

*Comparative Sample

EXAMPLE 2

The ingredients shown in Table 2 in proportions (% by weight) shown in Table 2 were blended to obtain mixtures A and B. Coating compositions were prepared by mixing the mixtures A and B with each other. The ingredients used are as follows:
Particulate material:
EPIFOAM F-221 (the same as used in Example 1)
Charge controlling agent:
Silica, CARPLEX #1120 (the same as used in Example 1)
Silica, AEROSIL #300 (the same as used in Example 1)
Polymethyl methacrylate, MP-2701 (the same as used in Example 1)
Polymethyl methacrylate, MP-1000 (the same as used in Example 1)

TABLE 2

| Experiment No. | 13 | 14 | 15 |
|---|---|---|---|
| Mixture A | | | |
| Particulate Material F-221 | 49.85 | 49.95 | 49.8 |
| Charge Controlling agent | | | |
| Acrylic resin MP-2701 | 0.15 | | 0.2 |
| Silica #1120 | | 0.05 | |
| Mixture B | | | |
| Particulate Material F-221 | 49.85 | 49.95 | 49.9 |
| Charge Controlling agent | | | |
| Acrylic resin MP-1000 | 0.15 | | 0.1 |
| Silica #300 | | 0.05 | |
| Amount of Coating (g) | 4.3 | 4.1 | 4.9 |
| Condition of Coating in Slots | good | good | good |

EXAMPLE 3

Experiments Nos. 11 and 15 were repeated in the same manner as described except that the coating time was changed to 60, 90, 120 and 150 seconds. The amount of the coating composition deposited to the armature was as shown in Table 3.

TABLE 3

| | Coating Time (seconds) | | | | |
|---|---|---|---|---|---|
| Amount of Coating (g) | 30 | 60 | 90 | 120 | 150 |
| Experiment No. 15 | 4.9 | 7.0 | 7.8 | 8.8 | 9.9 |
| Experiment No. 11* | 2.5 | 3.4 | 3.8 | 4.0 | 4.1 |

*Comparative Sample

What is claimed is:
1. A powder coating composition comprising an epoxy resin particulate material selected from the group consisting of particles having good chargeability and particles having poor chargeability, said particulate material having a particle size in the range of 3–180 μm and a volume resistivity of at least $10^7$ ohm cm and each of said particles containing an epoxy resin and a curing agent for the epoxy resin, and a charge controlling agent selected from the group consisting of an acrylic resin having an average particle size in the range of 0.01–1 μm, with the proviso that said acrylic resin is negatively chargeable in contact with iron powder when said epoxy resin particulate material has good chargeability and said acrylic resin is positively chargeable in contact with iron powder when said epoxy resin particulate material has poor chargeability, the amount of said charge controlling agent being 0.01-5% based on the total weight of said particulate material and said charge controlling agent, and said charge controlling agent being present on surfaces of said particles of said particulate material.

2. A composition according to claim 1, wherein said acrylic resin is 0.01-1.0% by weight based on the total weight of said acrylic resin and said particulate material.

3. A composition according to claim 1, wherein said acrylic resin has an average particle size in the range of 0.15-0.6 μm.

* * * * *

UNITED STATES PATENT AND TRADEMARK OFFICE
CERTIFICATE OF CORRECTION

PATENT NO. : 5,319,002
DATED : June 7, 1994
INVENTOR(S) : MATSUZAKI et al

It is certified that error appears in the above-indentified patent and that said Letters Patent is hereby corrected as shown below:

Col. 6, line 66, "0.01-1" should read --0.05-1--.

Signed and Sealed this

Twenty-eight Day of February, 1995

Attest:

BRUCE LEHMAN

Attesting Officer     Commissioner of Patents and Trademarks